May 14, 1946.    W. T. MOORE ET AL    2,400,128
FUSE
Filed April 23, 1941    2 Sheets-Sheet 1

Inventors
Wiley T. Moore
Joseph H. Church
Wilfred E. Thibodeau
By
Attorneys

Inventors
Wiley T. Moore
Joseph H. Church
Wilfred E. Thibodeau

By G. J. Kessenich + J. H. Church
Attorneys

Patented May 14, 1946

2,400,128

UNITED STATES PATENT OFFICE 2,400,128

FUSE

Wiley T. Moore, United States Army, Laverne, Okla., Joseph H. Church, Austin, Minn., and Wilfred E. Thibodeau, Cleveland, Ohio Application April 23, 1941, Serial No. 389,922

6 Claims. (Cl. 102—73)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to projectiles and in particular to a small or medium arms projectile having a simple plug-like impact firing mechanism.

In the field of these smaller projectiles, the known, complex mechanical fuses are not necessary from the standpoint of performance, nor, in view of production requirements, are they desirable.

The projectile of the invention eliminates most ordinary fuse components and mechanical movements and employs as a percussion firing member, a simple plug-like closure designed to yield on impact. This is accomplished with a multi-component plug having a yieldable portion for holding engagement with the projectile, and a hard portion for contact with the primer after the yielding of the holding portion. The plug is to be distinguished from that shown and claimed in application, Serial No. 375,797, now Patent No. 2,367,245 in that the latter is limited to a plug carrying a firing pin immobilized by centrifugal force. The plug of the present invention also differs from those in application, Serial No. 375,-379, now Patent No. 2,314,891 where the plugs are limited to a binary composition to be rendered porous or otherwise structurally weakened by the evanescence of one component.

It is therefore an object of this invention to produce a projectile with a plug-like firing means attached to the projectile through a yieldable component.

To these and other ends, the invention consists in the construction, arrangement and combination of elements described hereinafter and pointed out in the claims forming a part of this specification.

A practical embodiment of the invention is illustrated in the accompanying drawings in which:

Figures 1 to 3, 7 to 11, and 13 to 21 are longitudinal sections of the nose portions of projectiles.

Figure 1:
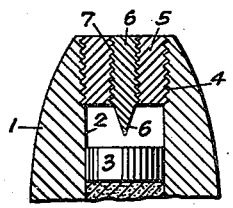

Referring to the drawings by characters of reference, there is shown in Figure 1 a projectile body 1 having a bored axial chamber 2 carrying a primer 3 and threaded as at 4 to receive a lead plug 5 with a harder metal firing pin 6 anchored axially therein, preferably by means of threads 7 or other non-slip means. The plug serves as a closure against dust, moisture and other deleterious foreign matter, and on impact with a target, the plug is sheared along the line of the threads 4 to carry the firing pin 6 into the primer.

Figure 2:
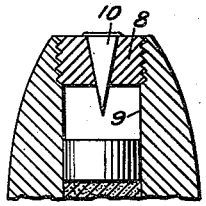

In Figure 2, a solid lead plug 8 is threaded into the bore 9 of the projectile and carries a headed firing pin 10 of tapering section.

Figure 3:
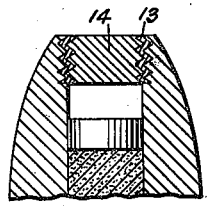

In Figure 3 is shown a projectile with a lead plug 13 threaded in. The hard metal insert 14, constituting a firing pin is relatively large in cross-section leaving a minimum peripheral lead portion, just sufficient to permit clearance of the threads of the projectile and of the insert on shearing, or a slight overlapping of the threads.

Figure 4:
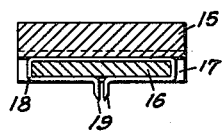
Figure 4 is a longitudinal section of a modified plug.
Figure 5:
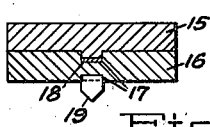
Figure 5 is a section taken at right angles to that of Figure 4.

In Figure 4 is shown a plug composed of two lead disks 15, 16. Lower disk 16 is girdled diametrically by a groove 17 into which is bent an elongated member 18. Pointed ends 19 are turned downward to serve as firing pins. The parts 15, 16 are joined in any convenient manner, as by pressing together after adding the member 18.

Figure 6:
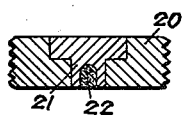
Figures 6, 12 and 22 are longitudinal sections of modified plugs.

In Figure 6 is shown a plug 20 of lead, in which is embedded, as the hard member, an explosive rivet or the like, 21, holding explosive material 22. This explosive material may constitute the primer for the shell, or may be carried in addition to a primer, in which case, both the rivet and its charge will be effective to set off the primer proper.

Figure 7:
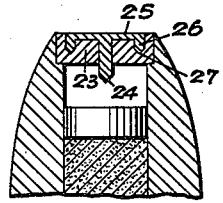

In Figure 7 is shown a projectile having a lead plug 23 carrying a firing pin 24. The pin has a disk-like top 25 with a depending flange 26 formed with a cutting edge 27. The cutting edge facilitates passage of the pin through the lead block on impact. The top and its flange may be a simple bar member instead of a full disk.

Figure 8:
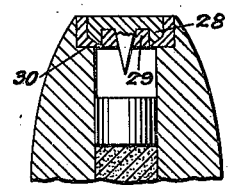
Figure 9:
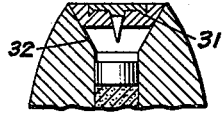

In Figure 8 is shown a projectile somewhat similar to that of Figure 7 except that the cutting flange 28 is designed to pierce the bottom of the lead plug 29 on setback, being thereafter retained on the shoulder 30 until driven into the primer on impact. Figure 9 shows a projectile having functions similar to that of Figure 8. In this case the cutting flange 31 of the pin is arrested by a slant-walled bore 32 after setback.

Figure 10:
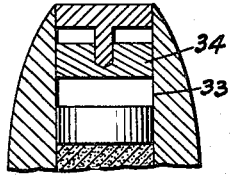

In Figure 10 is shown a projectile with a straight bore 33. Midway of the bore a lead plug 34 is tightly fitted, and above the lead plug with its point embedded therein, a firing pin is slidably carried in the bore. In ordinary handling the lead plug will immobilize the pin, and it will prevent complete penetration to the primer on setback. On impact, however, the pin will pierce the plug and reach the primer.

Figure 11:
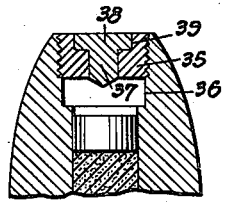
Figure 12:
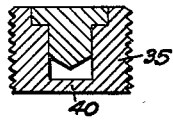

In Figure 11 a lead sleeve 35 is threaded or otherwise fixed in a counterbore 36 in a projectile. A pin 37 is received in the sleeve 35 and the pin head 38 is carried in a counterbore 39 on the sleeve. On impact the pin head 38 will sweep the lead of the sleeve below it back into the counterbore 36 and pass on to the primer. In Figure 12 is shown a modification of the plug of Figure 11 wherein additional safety is provided by closing off the bottom of the sleeve 35 as at 40.

Figure 13:
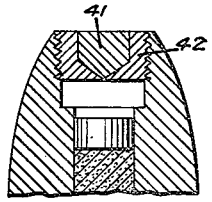
Figure 14:
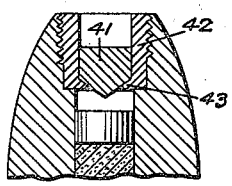

In Figure 13 is shown a projectile having a plug unit drawn along the general lines of the plug of Figure 11. The pin 41 carried in a lead plug 42 has no head in this case, and its point is located near the bottom of the plug so that on setback the pin will pierce the plug and take up a position as shown in Figure 14 with a small portion 43 of the lead protruding into the path of the pin after filling the counterbore 44. On impact, this small excess of lead, 43, is sheared to free the pin.

Figure 15:
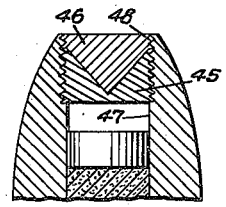

Figure 15 shows a projectile having a plug member with a lower component 45 of lead and an upper component 46 of a harder metal, both threaded into a bore 47 in the projectile. The upper component serves as a firing pin and is not only held safe by the lower layer of lead but also by its own threads 48. These threads 48 are few in number, so that the pin will easily yield on impact. The lead layer offers little resistance at impact and the pin is enabled to reach the primer.

Figure 16:
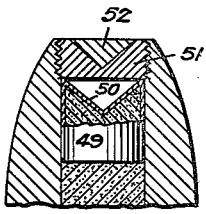
Figure 17:
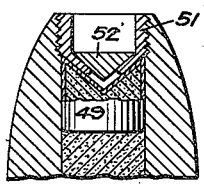

In Figure 16 is shown a projectile having a primer capsule 49 with a recessed forward end 50. A lead plug 51 in the nose of the projectile carries a conical firing pin 52. The plug may be so designed that the pin will pierce the lead plug on setback and take up a position in the primer recess as shown in Figure 17. On impact, the pin will be driven into the primer while the projectile nose is effecting initial penetration of the target. On explosion of the projectile the pin 52 will be hurled forward to aid the penetration in a manner well known in the art. This function obtains to some degree, more or less, in most of the plug fuses of the present invention, but is particularly pronounced in this species.

Figure 18:
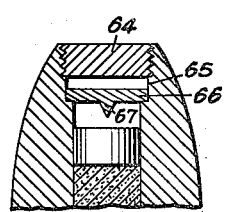

In Figure 18 an outer plug 64 of lead is threaded or otherwise held in a counterbore 65. Snugly fitted in the counterbore and resting on the bottom thereof is a disk 66 carrying a firing pin 67. This disk may be replaced by a bar spanning the bore 65. On impact, the plug 64 is sheared from its threaded connection and bends or shears the member 66 so that the pin 67 contacts the primer.

Figure 19:
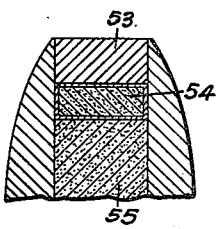

In Figure 19, a lead plug 53 is carried above a detonating charge 54 comprising nitroglycerin carried in a desensitizing medium. Below the detonating charge is a main explosive charge 55.

Figure 20:
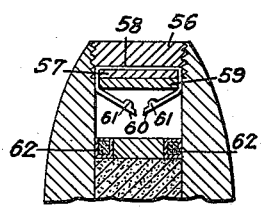
Figure 21:
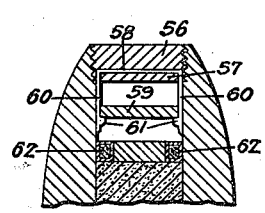

In Figure 20 is shown a plug member bearing a general similarity to other forms described above, but having additional safety features. The plug, like the form in Figure 4, has an upper lead portion 56, and a lower, grooved lead portion 57 with an inlaid firing pin member 58. These lead portions are threaded or otherwise fixed in the shell bore. Under the plug is a loose metallic member 59 radially slotted to receive the sides of the member 58 and held in place by the inturned lower arms 60 thereof. On setback the loose member will force the arms 60 outward to the position shown in Figure 21 and is held against further displacement by the lugs 61 on the arms 60. On impact, the lead members will be sheared from their engagement with the shell and arms 60 will penetrate the primers 62.

Figure 22:
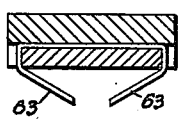

Figure 22 shows a plug designed to function along the general lines of that of Figure 20, but the loose member 59 has been omitted and the straightening of arms 63 is initiated by setback, due to their own mass and continued under the urging of centrifugal force. This plug differs functionally from that of Figure 20 in that the firing arms 63 may be designed to return to a safe position on cessation of the centrifugal action.

We claim:

1. An explosive projectile having an axial opening in the ogive containing a primer, a plug in the opening in advance of the primer and spaced therefrom to form a chamber between the plug and primer, said plug comprising a yielding component secured to the wall of the opening and a hard metal insert suspended in the component, a portion of the component, disposed between the insert and chamber, being adapted to be swept away and into the chamber by the rearward movement of the insert, said swept-away portion being of sufficient mass to arrest the initial setback tendency of the insert and thereby retain the insert out of engagement with the primer until a greater rearwardly propelling force is encountered on impact, said component providing the sole means of inhibiting the rearward movement of the insert.

2. An explosive projectile as in claim 1, said insert having cutting portions to cut the component for separating the swept-away portion from the remainder of the component on setback.

3. An explosive projectile as in claim 1, said chamber being restricted relatively to the plug, and a portion of the insert being sufficiently large to engage and be arrested by the chamber wall on setback of the insert.

4. An explosive projectile as in claim 1, said chamber being restricted, relatively to the opening portion containing the plug, to form an upwardly facing shoulder, and said insert having a portion for engaging the edge of the shoulder on setback for shearing the component portion situated therebetween.

5. An explosive projectile as in claim 1, said insert being tapered at its inner, rear end to push the swept-away portion laterally therefrom into the chamber.

6. An explosive projectile having an axial opening in the ogive containing a primer, a plug in the opening in advance of the primer and spaced therefrom to form a chamber between the plug and primer, said plug comprising a yielding component secured to the wall of the opening and a hard metal insert suspended in the component, a portion of the component, disposed between the insert and chamber, being adapted to be swept away and into the chamber by the rearward movement of the insert, said swept-away portion being of sufficient mass to arrest the initial setback movement of the insert and retain the insert out of engagement with the primer until a greater rearwardly propelling force is encountered on impact, said component providing the sole means of controlling the rearward movement of the insert, said primer having a conical recessed end facing the plug and forming said chamber, and said insert being tapered on its rear, inner end, to conform to said chamber, and to push the swept-away portion of the component laterally into the chamber on setback.

WILEY T. MOORE.
JOSEPH H. CHURCH.
WILFRED E. THIBODEAU.